3,307,271
PROCESS FOR DRYING POLYMERS
Donald Lanny Simpson, Seaford, Del., assignor to E. I. du Pont de Nemours and Company, Wilmington, Del., a corporation of Delaware
Filed Feb. 6, 1964, Ser. No. 342,902
5 Claims. (Cl. 34—32)

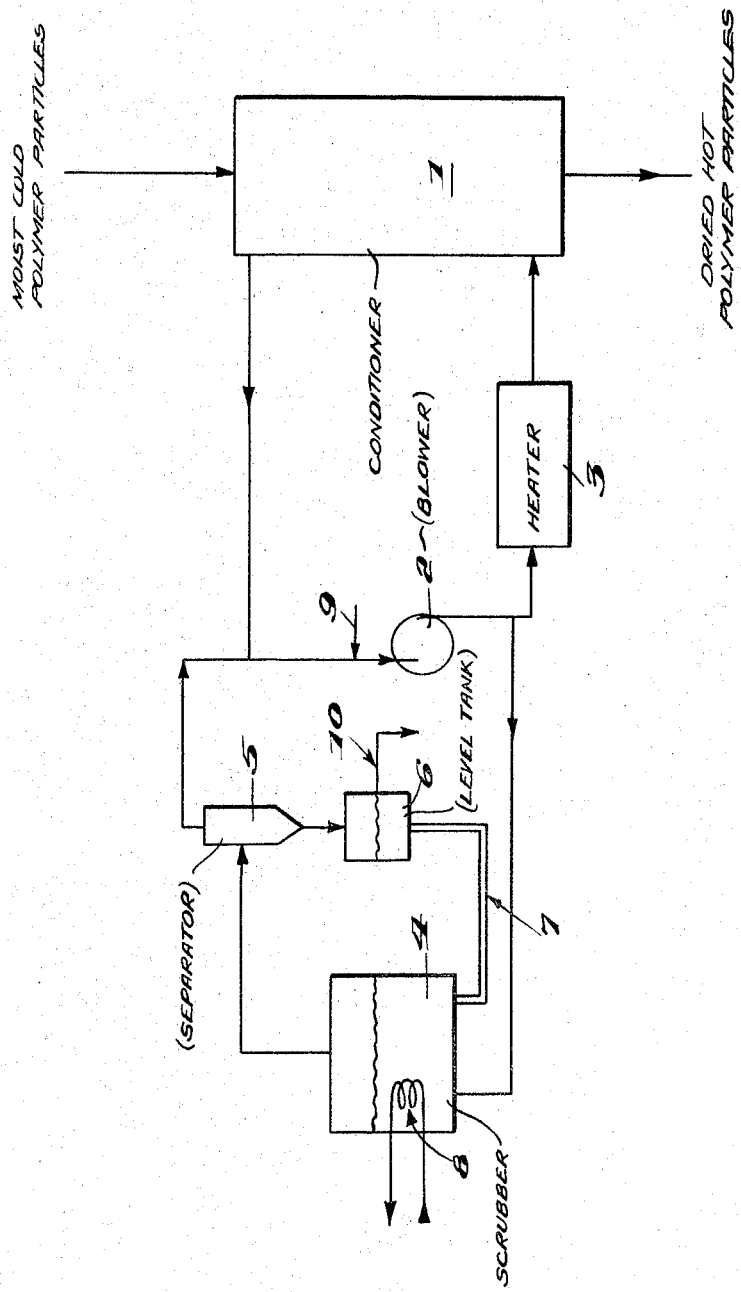

This invention relates to drying and, more particularly, to a novel process for drying polymer particles.

In condensation polymerization the reaction to form the interunit linkage proceeds both in the forward (polymerization) and in the reverse (depolymerization) direction. For example, during polyamidation, when the water by-product accumulates, depolyamidation occurs. Therefore, the water concentration in a polyamide melt needs to be kept low and uniform in order to secure a uniform product with the necessary level of relative viscosity which is the measure of molecular weight.

Another source of water aggravates depolymerization. On being discharged from the polymerization equipment, the just-solidified, hot polymer is sprayed with cooling water. The cooling water that remains on the surface of the polymer particles must be removed before melt-spinning or melt-casting. Conventional practice is to store such polymer in a large bin, and there dry the polymer particles in a two-stage process. However, such drying is expensive and time-consuming. It is also exceedingly difficult to provide a uniformly dry product with such a process, resulting in considerable fluctuation of the relative viscosity of the polymer.

The principal object of this invention is to provide an inexpensive process for drying polymer particles.

Another object of this invention is to provide uniformly dry polymer particles for melt-spinning and for melt-casting.

A further object of this invention is to provide polymer melt with minimum deviation from means relative viscosity.

Other objects will appear hereinafter.

The objects of this invention are accomplished by a process wherein a gaseous drying medium is circulated in countercurrent flow with polymer particles bearing vaporizable liquid and the vapor content of said drying medium is kept lowered by recirculation of a portion of the drying medium through a volume of said vaporizable liquid.

The figure is a schematic flow diagram which more particularly defines the process of this invention for a polymer-water system. Moist cold polymer particles enter at the top of flake conditioner 1 and leave as dried hot polymer particles at the bottom of the flake conditioner to be melted in adjacent equipment. Blower 2 recycles drying medium first through a heater 3, then into the bottom of conditioner 1 where the drying media flows countercurrently to the continuous passage of the polymer particles. The drying medium exits from the conditioner 1 laden with moisture from the polymer particles and returns to the inlet of the blower. A small side stream from the discharge of said blower is bubbled through scrubber 4 (equipped with cooling coils 8), where the drying medium is dehumidified, passes through entrainment separator 5, and then returns to the inlet of blower 2. Nitrogen gas make-up is added at 9 to account for system leaks. Circulating cooling water inside the coils 8 of scrubber 4 keeps low the temperature of the condensed water in scrubber 4. Entrainment separator 5 discharges to level tank 6. The water level in scrubber 4 is kept level with the water level in level tank 6 with balancing pipe 7. Excess water is critically discharged (10) from the level tank. Equilibrium conditions are extremely difficult to maintain in the absence of the level tank.

As a further description of the process of this invention, the example below tells quantitatively the operation of equipment used in the process of this invention.

*Example*

1300 pounds per hour of poly(hexamethylene adipamide) flake at 131° F. and containing about 0.45% by weight water are fed to the top of a conditioner vessel of 5000 pounds nylon flake capacity. From the bottom of said conditioner vessel are discharged 1300 pounds per hour of poly(hexamethylene adipamide) flake at 275° F., and 1.95 pounds per hour steam at 275° F.

A 1500 cubic feet per minute blower recycles nitrogen gas by sending 1450 cubic feet per minute first through a tubular heat exchanger, where it is heated from about 200° F. up to about 275° F., and then through the said conditioner vessel in countercurrent flow to said polymer. Nitrogen gas, containing water vapor removed from said polymer, leaves the conditioner top at about 200° F. and returns to the inlet of said blower.

For removal of said water vapor, a side stream of 50 cubic feet per minute of nitrogen gas-water vapor mixture at about 200° F. from the blower discharge is recirculated through a scrubber where it is cooled to about 90° F., and then returns to the inlet of said blower. Sufficient water at about 90° F. is discharged from a level tank connected to the scrubber in order to effect material balance for the system. Heat is removed from this water-vapor removal system by chilled water circulating through coils located inside the scrubber.

The nitrogen gas make-up for unavoidable leaks in the system, approximately 9 cubic feet per minute, is added to the inlet side of the blower.

The poly(hexamethylene adipamide) flake from said conditioner vessel is then melted and extruded as filaments of uniformly high relative viscosity, tensile strength, and dyeability.

The process of this invention has unexpectedly superior efficiency when contrasted to conventional polymer flake drying. Particularly, the process of this invention is contrary to the conventional and obvious practice of multi-stage drying, as well as to the conventional and obvious practice of drying by bleeding away drying medium, a practice which should effect maximum efficiency. But these conventional and obvious practices are actually less efficient.

In a conventional multi-stage drying process for 1300 pounds per hour of poly(hexamethylene adipamide) flake containing 0.45% by weight water, using the same conditioner vessel, and bleeding away nitrogen gas when said gas has maximum vapor content, the make-up nitrogen gas needed is four times as much as in the process of this invention. Recycling a portion of the nitrogen gas as described by the process of this invention saves on the amount of nitrogen gas required and allows the use of a closed system, thus minimizing the nitrogen leakage and polymer contamination. Furthermore, 459 samplings taken over a period of six months show that polymer melt provided by the process of this invention has a 14.4% more uniform relative viscosity than polymer melt provided by conventional multi-stage drying.

Although the example above is for poly(hexamethylene adipamide), the process of this invention is also useful for all other polyamides, for polyesters and for all other polymers that need to be dried before shaping into either filaments, sheets or other extruded articles.

It is apparent that many variations and modifications of this invention may be accomplished without departing from the spirit of the present invention which is accord-

What is claimed is:

1. A single-stage process for drying polymer particles comprising circulating a gaseous drying medium in countercurrent flow with polymer particles bearing vaporizable liquid and keeping the vapor content of said drying medium lowered by recirculation of a portion of said drying medium through a volume of said vaporizable liquid.

2. The process of claim 1 wherein said gaseous drying medium is nitrogen gas.

3. The process of claim 1 wherein the volume of said vaporizable liquid is supplied by the vaporizable liquid condensed during the constant recirculation of a portion of said drying medium.

4. The process of claim 1 wherein said polymer is a polyamide.

5. The process of claim 1 wherein said polymer is poly(hexamethylene adipamide).

References Cited by the Examiner
UNITED STATES PATENTS

| 3,112,188 | 11/1963 | Zehnder | 34—77 |
| 3,116,124 | 12/1963 | Eolkin | 34—36 X |
| 3,166,385 | 1/1965 | Pahlavouni | 34—36 X |

OTHER REFERENCES

Kern, Process Heat Transfer, McGraw-Hill, New York, 1950, pages 613–614.

DONLEY J. STOCKING, *Primary Examiner.*

FREDERICK L. MATTESON, JR., *Examiner.*

C. R. REMKE, *Assistant Examiner.*